United States Patent Office 2,812,338
Patented Nov. 5, 1957

2,812,338

PREPARATION OF CYANOHYDRINS

Ellington M. Beavers, Philadelphia, Pa., and Edward F. Riener, Haddonfield, N. J., assignors to Rohm & Haas Company, Philadelphia, Pa., a corporation of Delaware No Drawing. Application June 29, 1955, Serial No. 518,983

10 Claims. (Cl. 260—404)

This invention relates to cyanohydrins of aliphatic acids, esters and nitriles. It relates to cyanohydrins of those saturated aliphatic acids which contain 16 to 22 carbon atoms in the acid chains and to the esters and nitriles of said acids. More particularly it relates to the cyanohydrins of stearic acid, of stearonitrile and of stearic acid esters.

An object of this invention is to provide an economical, efficient and safe method for preparing cyanohydrins of acids, esters and nitriles. More particularly, an object is to prepare acids, esters of said acids and nitriles of said acids, all of which contain 16 to 22 carbon atoms in the acid chain and all of which also contain a cyano group, —CN, and an hydroxyl group, —OH, on vicinal carbon atoms in the acid chains. A further object is to prepare such cyanohydrins without the use of hydrogen cyanide.

These and other objects are accomplished by the process of this invention which comprises reacting an epoxy acid of 16 to 22 carbon atoms, or an ester or a nitrile of said acid, with a cyanide salt of an alkali metal, particularly sodium cyanide and/or potassium cyanide in the presence of a solvent for the reaction mixture. During the reaction, which takes place essentially quantitatively under convenient conditions, there occurs an opening of the oxirane ring of the epoxidized reactant and the formation of the alkali metal salt of the cyanohydrin. This can be readily understood from the following representation of the reaction of methyl epoxystearate and sodium cyanide to form a mixture of the isomeric sodium salts of methyl 9,10- and 10,9-cyanohydroxystearate.

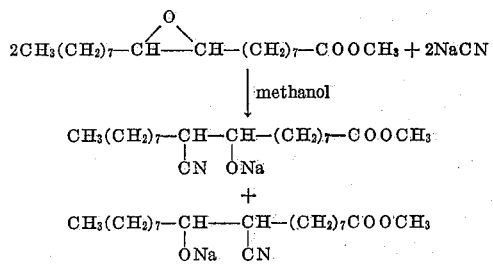

Subsequent treatment with an acid converts the salt groups, shown as —ONa above, to hydroxyl groups.

The products of this invention, as well as the method of making them, are believed to be novel. The products are particularly useful because they can be fused with caustic alkali to give rise to mixtures of monobasic and dibasic acids for which currently there is a great need in the plastics industry. The caustic fusion of the products of this invention is the subject of an application for Letters Patent by one of us, Serial No. 518,982 filed June 29, 1955. The cyanohydroxy compounds of this invention are useful, in their own rights, as plasticizers for vinyl resins, particularly polyvinyl chloride.

The epoxy acids, esters and nitriles which are converted by the process of this invention to cyanohydroxy compounds can be made by the reaction of peracids, such as performic and peracetic acids, with unsaturated, aliphatic acids, esters and nitriles such as oleic, erucic, eleostearic, linoleic, linolenic, clupanodonic, palmitoleic and palmitolenic acids, and the corresponding nitriles of these acids, and the esters of these acids and monohydric or polyhydric alcohols. The epoxy compounds can also be made by the reaction of a strong base with haloacyloxy derivatives of the same acids, esters and nitriles. This second method of making epoxides is the subject of another application by one of use for Letters Patent, Serial No. 461,915, filed October 12, 1954, now United States Patent No. 2,756,242. The halo-acyloxy acids, esters and nitriles, per se, are made by the reaction of a lower aliphatic acid, such as formic or acetic acid, and a tert-alkyl hypohalite, such as tert-butyl hypochlorite, with an unsaturated, aliphatic acid, ester or nitrile, such as are listed above, according to the process of another application for Letters Patent, Serial No. 423,846, filed April 16, 1954.

All of the epoxidized acids, esters and nitriles, which are converted by the instant process to cyanohydroxy compounds, contain 16 to 22 carbon atoms and at least one epoxy group in the acid chains. Thus, they are the epoxy derivatives of palimitic, margaric, stearic, nondecoic, arachidic, eicosic and behenic acids, and of the esters and nitriles of these acids. As regards the esters, it is to be noted that they are the esters of the epoxy acids listed above and either monohydric or polyhydric alcohols which are typified by the following: methyl, ethyl, isopropyl, sec-butyl, n-butyl, tert-butyl, tert-amyl, 2-ethylhexyl, lauryl, octadecyl, cyclohexyl and benzyl alcohols; ethylene glycol, 1,2-propylene glycol, 2-ethylhexanediol-1,3, butanediol-1,3, butandiol-1,4, dodecandiol-1,12; diethylene glycol; glycerol; pentaerythritol; and the isomers and homologues of the above. The glyceridic esters of epoxy acids which can be converted to the corresponding cyanohydrino esters include the epoxidized natural oils and fats such as the following: epoxidized tallow, yellow grease and brown grease and epoxidized soybean, corn, cottonseed, safflower, sunflower, sesame, poppyseed, walnut, peanut, linseed, perilla and sardine oils.

Of the alkali metal cyanides which can be used, sodium cyanide is the salt of first choice. Obviously mixtures of cyanides such as mixtures of sodium cyanide and potassium cyanide can be used if desired. It is preferred to use an excess over stoichiometrical amounts of the alkali metal cyanide. Thus, it is preferred to employ two to three moles of alkali metal cyanide for each epoxy group in each mole of the epoxy compound.

The epoxy acid, ester or nitrile can be reacted with the alkali metal cyanide over a wide range of temperature—from room temperature to the decomposition point of the cyanohydrin which is formed. Practically, temperatures from about 50° C. to about 120° C. are preferred because these can be maintained conveniently and the rate of reaction within this range of temperature is satisfactory.

The reaction is best carried out in the presence of an organic liquid which is a solvent for the epoxidized compound and which also dissolves at least a small amount of the alkali metal cyanide. Alcohols, particularly the lower alkanols such as methanol, ethanol, propanol and butanol, are the preferred class of solvents. Ethylene glycol and glycerol are suitable, as well as are acetonitrile, tetrahydrofuran, tetrahydrofurfuryl alcohol, dimethylformamide and nitro alcohols. Methanol, ethanol and glycerol are particularly preferred because the reaction progresses more readily and steadily when they are present. This may be due to the greater solubility of the alkali metal cyanide in these alcohols than in the other alcohols. The amount of solvent is not critical since it is not a reactant but serves only to reduce the viscosity of the reaction mixture and to dissolve reactive quantities of the metal cyanide. Methanol and ethanol are recommended because the reaction proceeds very satisfactorily at the refluxing temperatures which are easily maintained. For example, quantitative conversion of an epoxide to the cyanohydrin takes place in about 16 hours when methanol is employed and when the reaction is carried out at refluxing temperature.

After the reaction is complete, the solvent is removed by distillation and the reaction product is treated with water which dissolves the salt of the cyanohydrin. After filtration, the aqueous filtrate is acidified with an acid such as hydrochloric or sulfuric acid and the cyanohydrin which is thus formed separates from the aqueous phase and is removed.

The following examples, in which all parts are by weight, further illustrate this invention:

*Example 1*

A mixture of 50 parts (0.16 mole) of methyl 9,10-epoxystearate, having an oxirane oxygen-content of 4.59%, 23.6 parts (0.48 mole) of sodium cyanide and 240 parts of methanol was stirred and heated to refluxing temperature in a reactor equipped with an agitator, a thermometer and a reflux condenser. The reaction mixture was held at refluxing temperature for 17 hours after which it was cooled and treated with 1000 parts of water. The mixture was next acidified with hydrochloric acid and was finally extracted with 400 parts of benzene. The benzene solution was evaporated and a quantitative yield of methyl cyanohydroxystearate was obtained. The ester was purified by distillation and its composition was confirmed by analysis (C=71.04%; H=10.77%; N=4.3%; index of refraction, $n_D^{20}$=1.4618; B. P.=198° to 210° C. at 0.3 mm. Hg).

*Example 2*

Some of the methyl cyanohydroxystearate prepared by the process of Example 1 was hydrolyzed with aqueous sulfuric acid to cyanohydroxystearic acid. The yield was approximately quantitative and the composition was confirmed by analysis (C=69.52%; H=10.57%; N=4.2%; oxirane oxygen=nil).

The method of Example 1 is employed in the preparation of the cyanohydroxy derivatives of other esters of stearic acid.

As indicated above, the epoxy compounds, from which the cyanohydroxy compounds of this invention are prepared, can, themselves, be made by the reaction of alcoholic alkali on the corresponding halo-acyloxy compound. In fact, a very convenient way of making the cyanohydroxy compounds without isolating an epoxide is to heat a reaction mixture of an alcohol, an hydroxide of an alkali metal, a cyanide of an alkali metal, and a halo-acyloxy compound. In this way, the halo-acyloxy compound is rapidly converted to the corresponding epoxy compound and the latter, formed in situ, reacts with the alkali metal cyanide to produce the corresponding cyanohydrin. This procedure is illustrated by the following example.

*Example 3*

A mixture of 167.5 parts of 9,10- and 10,9-chloroformoxystearic acid, 28 parts of alcoholic potash, 37 parts of sodium cyanide, 540 parts of denatured ethanol was heated at refluxing temperature for 17 hours. Thereafter the reaction mixture was worked up in the manner described above and 150 parts of cyanohydroxystearic acid was obtained. Its composition was confirmed by analysis.

*Example 4*

In a similar way, a yield of 226.5 parts of methyl cyanohydroxystearate was obtained by the reaction of potassium hydroxide and sodium cyanide with 257.5 parts of methyl chloroformoxystearate in methanol over a period of 17 hours.

*Example 5*

For some purposes, as for example in the preparation of organic monobasic and dibasic acids, by the caustic fusion of the cyanohydroxy derivatives, it is not necessary to employ pure compounds. Thus, 200 parts of epoxidized tallow in methanol was reacted with sodium cyanide for 17 hours at the refluxing temperature and 170 parts of the cyanohydroxy derivative of tallow was obtained.

We claim:

1. The process for preparing cyanohydroxy compounds wherein the cyano and hydroxy groups are on vicinal carbon atoms which comprises reacting in the presence of a solvent for the reaction mixture an alkali metal cyanide with a member of the class consisting of (a) saturated hydrocarbon acids containing an epoxy group and 16 to 22 carbon atoms, (b) nitriles of said acids, and (c) esters of said acids and aliphatic saturated alcohols.

2. The process for preparing cyanohydroxystearic acid wherein the cyano and hydroxy groups are on vicinal carbon atoms which comprises reacting in the presence of a solvent for the reaction mixture an alkali metal cyanide with epoxystearic acid.

3. The process for preparing cyanohydroxy esters wherein the cyano and hydroxy groups are on vicinal carbon atoms which comprises reacting in the presence of a solvent for the reaction mixture an alkali metal cyanide with an ester of a lower alkanol and a saturated hydrocarbon acid containing an epoxy group and 16 to 22 carbon atoms.

4. The process of claim 3 in which the ester which reacts with the alkali metal cyanide is methyl epoxystearate.

5. The process for preparing a cyanohydrin of a glyceridic ester in which the cyano and hydroxy groups are on vicinal carbon atoms which comprises reacting in the presence of a solvent for the reaction mixture an alkali metal cyanide with a glyceridic ester of a saturated hydrocarbon acid containing an epoxy group and 16 to 22 carbon atoms.

6. The process of claim 5 in which the epoxidized glyceridic ester is epoxidized tallow.

7. As a new composition of matter, a cyanohydroxy compound which is a member of the class consisting of (a) saturated hydrocarbon acids containing 16 to 22 carbon atoms and having a cyano group and an hydroxy group on vicinal carbon atoms, (b) nitriles of said acids, and (c) esters of acids.

8. As a new composition of matter, cyanohydroxystearic acid wherein the cyano group and the hydroxyl group are on vicinal carbon atoms.

9. As a new composition of matter, methyl cyanohydroxystearate wherein the cyano group and the hydroxyl group are on vicinal carbon atoms.

10. As a new composition of matter, a glyceridic ester of cyanohydroxystearic acid wherein the cyano group and the hydroxyl group are on vicinal carbon atoms.

References Cited in the file of this patent

UNITED STATES PATENTS

| | | |
|---|---|---|
| 1,914,326 | Fick | June 13, 1933 |

FOREIGN PATENTS

| | | |
|---|---|---|
| 150,708 | Great Britain | Oct. 20, 1921 |
| 119,086 | Australia | June 14, 1945 |